Feb. 9, 1971  L. PIGOZZI  3,561,091
METHOD AND APPARATUS FOR COMPRESSING PISTON
RINGS AND INSTALLING PISTONS IN
CYLINDER BORES
Filed April 19, 1968  3 Sheets-Sheet 1
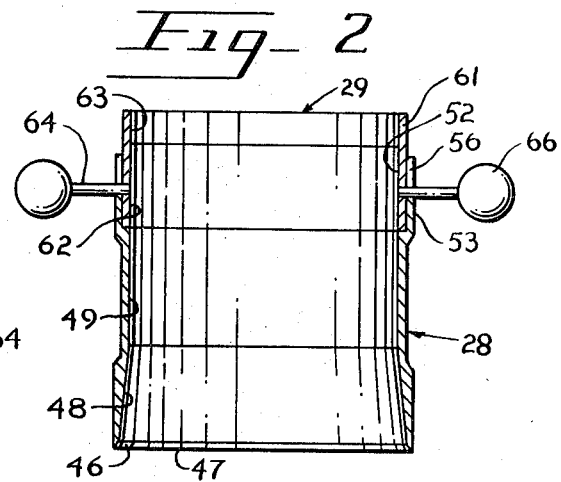
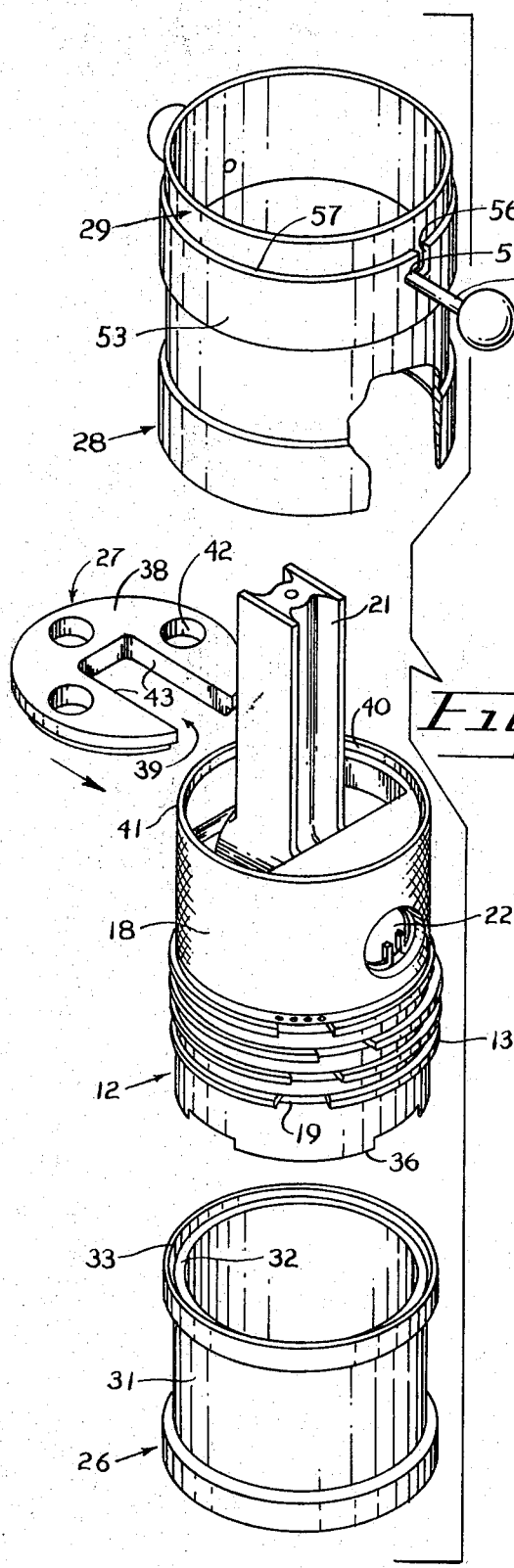
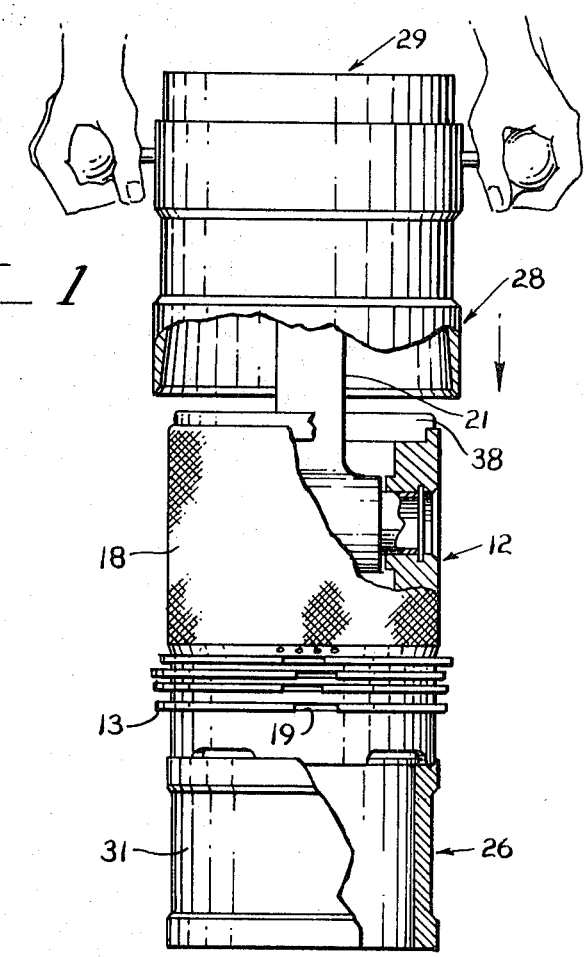
INVENTOR.
Leo Pigozzi
BY
Gardner + Zimmerman
Attorneys Feb. 9, 1971  L. PIGOZZI  3,561,091
METHOD AND APPARATUS FOR COMPRESSING PISTON
RINGS AND INSTALLING PISTONS IN
CYLINDER BORES
Filed April 19, 1968  3 Sheets-Sheet 2

INVENTOR.
Leo Pigozzi
BY
Gardner + Zimmerman
Attorneys

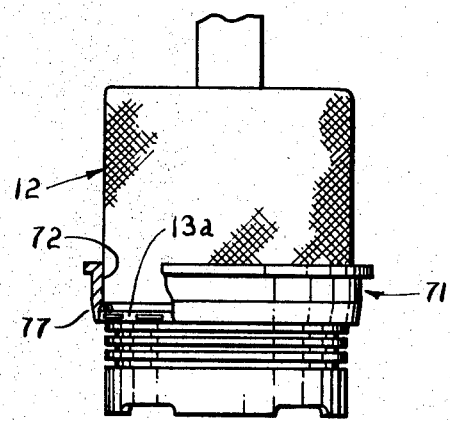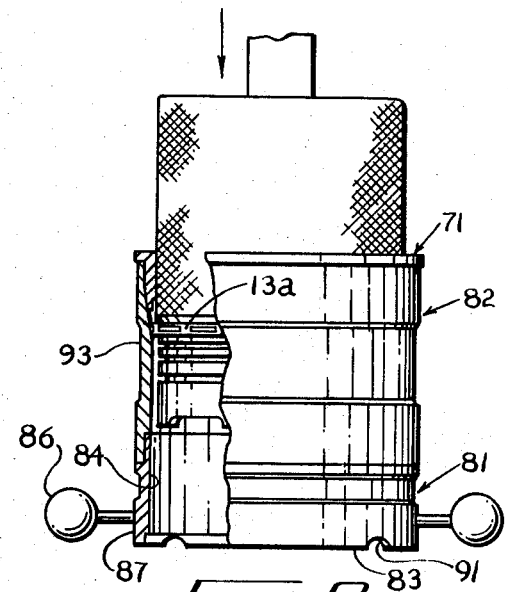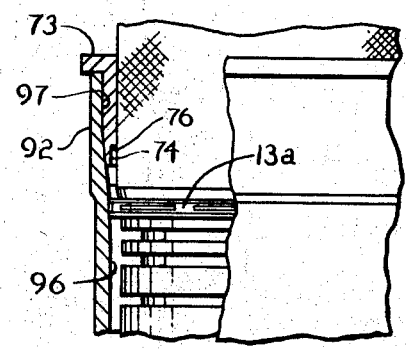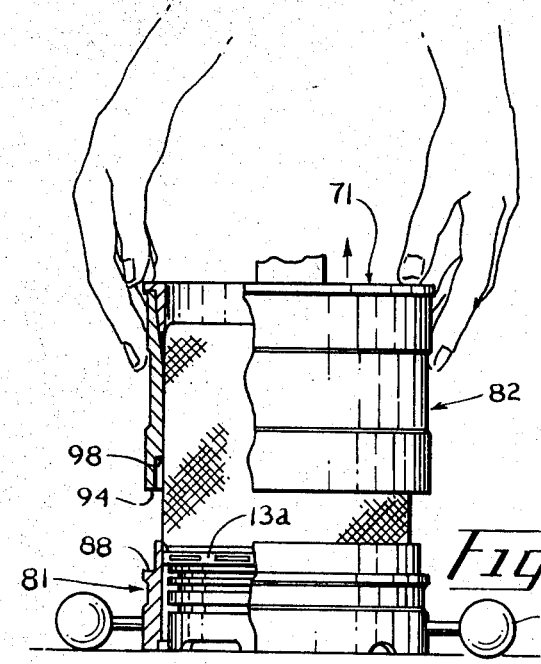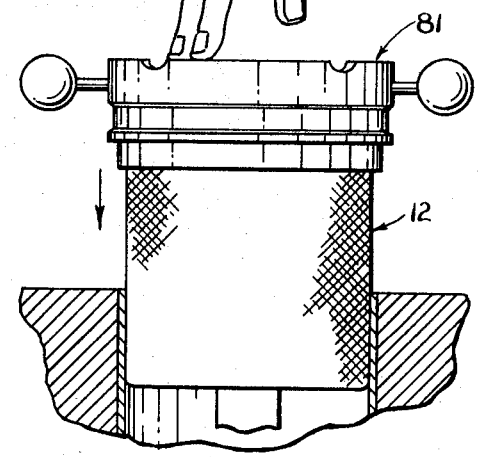

United States Patent Office 3,561,091
Patented Feb. 9, 1971

3,561,091
METHOD AND APPARATUS FOR COMPRESSING PISTON RINGS AND INSTALLING PISTONS IN CYLINDER BORES
Leo Pigozzi, 3215 Burdick Drive, Oakland, Calif. 94602
Filed Apr. 19, 1968, Ser. No. 722,811
Int. Cl. B23p *15/08, 19/04;* B23q *3/18*
U.S. Cl. 29—222                               1 Claim

ABSTRACT OF THE DISCLOSURE

A system of compressing piston rings on a piston by passing a sleeve member with a tapered bore over the rings to gradually compress the same. The sleeve feeds the piston and the compressed rings to a second sleeve with a generally cylindrical bore which maintains the rings in a compressed state. This latter sleeve, with the piston therein is then placed over the bore in a cylinder and the piston forced out of the sleeve and into the cylinder.

BACKGROUND OF THE INVENTION

The installation of pistons in cylinder bores presents a substantial problem, due to the fact that the axially spaced rings on the piston posses a normal diameter substantially in excess of the diameter of the cylinder bore. Thus, before the piston can be inserted into operative relation in the bore, the rings must be compressed to a diameter slightly less than that of the bore. The compression of relatively stiff rings, such as the oil ring on a diesel engine piston, requires considerable force, and it should also be pointed out that when the rings are initially placed in their appropriate grooves on ahe periphery of the piston, they are quite loose and tend to fall out of the grooves if not properly held, particularly when inserting the piston into the cylinder bore.

In accordance with the teachings of the present invention, the foregoing difficulties are overcome, and an extremely simple system has been worked out whereby event a relatively unskilled person without requiring the use of any additional tools or equipment can rapidly and positively first compress the rings on a piston to a degree wherein they are of a size permitting entry of the piston into the cylinder, and secondly use a portion of the same compressing apparatus for carrying the piston to the cylinder and installing the piston therein. The apparatus used in carrying out the present process is light in weight and is provided with means for facilitating the transport of the piston with its compressed rings, by eliminating the need to actually manually handle the normally oily and difficult to handle piston.

BRIEF DESCRIPTION OF THE DRAWINGS

FIG. 1 is an exploded perspective view of a piston with the apparatus of the present invention shown prior to placing the same on the piston.

FIG. 2 is a vetrical cross-sectional view of the two-piece ring-compressing fixture.

FIG. 3 is a vertical view, partly in cross-section, illustrating the manner of placing the fixture over the piston.

FIG. 8 is a vertical view, partly in section, of one piece of a modified form of fixture being inserted on a piston.

FIG. 9 is another view similar to FIG. 8, and illustrating the next step of compressing the piston rings in the fixture.

FIG. 10 is an enlarged view of a portion of the structure shown in FIG. 9.

FIG. 11 shows the removal of a portion of the fixture.

FIG. 12 illustrates the piston and remaining portions of the fixture inverted with the latter being inserted in a cylinder bore.

DESCRIPTION OF THE PREFERRED EMBODIMENTS

Figure 4:
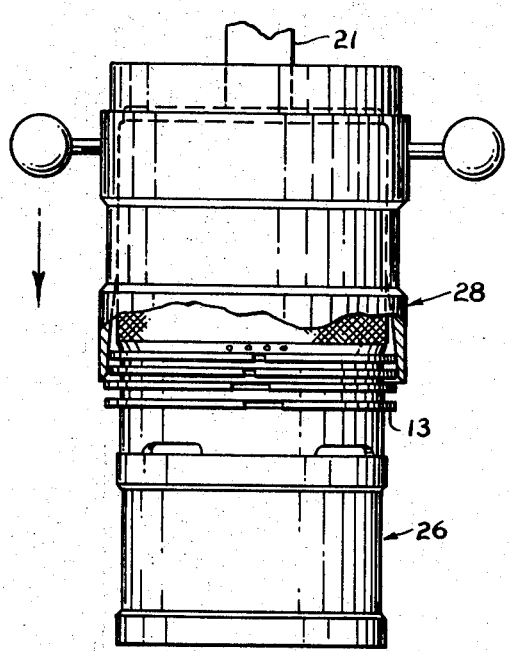
FIG. 4 is another vertical view, partly in section, illustrating the lowering of the fixture over the piston with some of the rings being initially compressed.

The method and apparatus of the present invention is adapted for use in connection with a piston 12 to compress the rings 13 therein, whereby the piston and ring assembly may be readily pushed into the bore 14 of a cylinder 16. Additionally and as will be made clear during the following description, the rings are properly positioned and held in such positions at all times, thereby avoiding the usual problems of rings falling out during this procedure.

As is well known in the art, the conventional piston has a substantially cylindrical body 18 which is provided with a plurality of circumferential grooves 19 in which the annular expansion rings 13 are seated. The rings are customarily of annular split form with a normal diameter larger than that of the cylinder bore 14. Consequently, in order to install the piston within the bore, it is necessary to completely compress the rings to a lesser diameter, and after installation, the rings exert a radially outward expansion forces against the cylinder bore to provide for proper sealing between the piston and cylinder.

The piston 12 is also provided with a piston rod 21 which is pivotally secured to the piston at one end thereof by a suitable pin 22 or the like extending diametrically thereof. The distal end of the piston is in turn connected to the crank shaft of the engine.

When a piston is removed from the cylinder for the purpose of installing new rings 13, it is a relatively simple matter to intially position the appropriate rings in their proper grooves 19 since their internal diameters are usually greater than the diameter of the piston body 18. In broad terms, the apparatus of this invention which serve to compress the rings generally include a piston supporting stand 26, a piston rod support plate 27, a first fixture sleeve 28, and a second fixture sleeve 29, the two sleeves cooperating to provide a unitary fixture as will be presently explained.

In carrying out the method of this invention, the stand 26 is first placed on any supporting surface. The stand preferably has a cylindrical body 31, whose upper end has an annular horizontal supporting surface 32 bounded by a vertical flange or lip 33 extending upwardly therefrom. The internal diameter of the flange 33 is such that when the end 36 of the piston remote from the rod 21 is placed on the surface 32, the flange will prevent lateral or radial displacement or movement of the piston. At the same time, it will be clear that the piston may be easily placed on or removed from the stand.

After the piston has been positioned on the stand, the upwardly extending piston rod is releasably locked in a vertical axially disposed position so as to avoid interference with subsequent operations. This may be done in a variety of manners, but as here illustrated, the plate 27 is utilized. The plate is in the form of a disk 38 having a slot 39 extending from one edge thereof for receiving the rod. The plate is dimensioned to rest on a groove 40 located at the end 41 of the piston. Plate 27 is further provided with a plurality of apertures 42 which facilitate insertion of the plate on the end 41 and subsequent removal of the same. When the plate is positioned with the slot generally parallel to the rod pin 22, the rod will be restrained from its normal pivotal movement due to engagement of the rod with the opposed edges 43 of the slot.

With the rings 13 loosely positioned and generally centered in their respective grooves 19, the two piece cylinder fixture is utilized. Before discussing the manner of use, a brief description will be given of the construction of the members 28 and 29, best illustrated in FIGS. 1 and 2 of the drawings. Sleeve 28 is of generally cylindrical form having a short entering bevelled bore portion 46 at its lower end 47. This portion 46 serves as a centering guide when the fixture is lowered over the piston in a manner later to be described. The slope of the bevel is in the neighborhood of 10 degrees from the vertical. The internal bore continues upwardly with a second tapered portion 48 at an angle of about 3 degrees. The next bore portion 49 has a taper of about 1½ degrees which terminates at its upper end with a radially outwardly extending shoulder 51. The upper end portion of the sleeve then continues upwardly from the outer peripheral portion of the shoulder with a cylindrical bore portion 52. The sleeve wall 53 in which bore portion 52 is located is provided with a pair of diametrically opposed bayonet slots, each having a first vertical slot section 56 extending downwardly from the upper end 57 of the sleeve and a horizontal slot section 58 extending from the lower end of slot 56.

Sleeve 29 is of a shorter cylindrical configuration than sleeve 28 and its wall 61 is adapted to snugly engage wall 53 of the other sleeve when the two parts are placed in cooperating relationship with possibly 0.005 inch clearance therebetween. Preferably the lower bore portion 62 of sleeve 29 has an inner taper of about 7¼ degree while the upper bore portion 63 is cylindrical. A pair of rods 64 extend from diametrically opposed portions of sleeve 29 with manually engageable handles 66 at the ends thereof.

The sleeves are assembled in their operative relationship by inserting sleeve 29 into sleeve 28 with the rods 64 aligned with slots 56. The sleeve 29 is lowered until its lower end seats on shoulder 51, and sleeve 29 is rotated so that the rods will enter slots 58 thereby preventing axial displacement of the two sleeves. By referring to FIG. 2, it will be seen that when assembled the bores of the two sleeves present a smooth and uninterrupted surface for receiving the piston in the following manner.

The sleeve assembly shown in FIGS. 1 and 2 is grasped by the handles 66 as illustrated in FIG. 3, passed over the vertically positioned rod 21 and generally centered over the piston end 41. Thus, as shown in FIG. 4, further lowering of the assembly will result in the rings 13 engaging the bore portions of sleeve 28. Due to the taper of the respective bore portions, the rings will be gradually compressed, and upon reaching bore portion 49 will be substantially completely in their compressed state.

Figure 5:
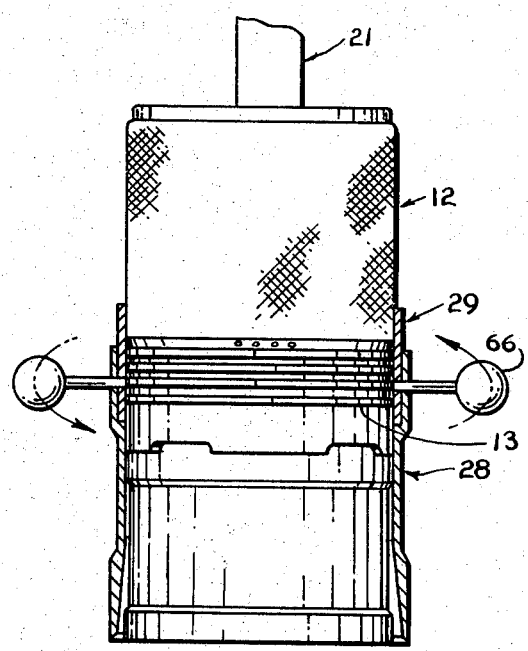
FIG. 5 is a view similar to FIG. 4 and showing the parts with the fixture fully descended and the rings compressed.

As shown in FIG. 5, further sleeve movement will cause the rings to pass from sleeve 28 to sleeve 29 wherein the rings will be maintained in their compressed state by engagement with the bore portions 62 and 63 of sleeve 29. It will also be noted that at this time, the sleeve 28 has passed over the supporting stand.

Figure 6:
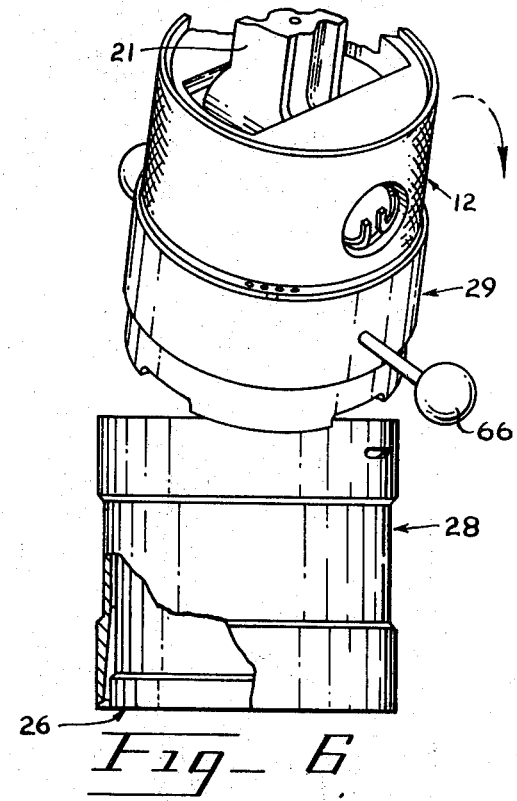
FIG. 6 illustrates the next step in the process of removing the piston with one section of the fixture.

The operator then may rotate sleeve 29 to release the bayonet connection, and holding the handles, raise the sleeve 29 from the sleeve 28 as shown in FIG. 6. Since the rings exert substantial pressure against the bore of sleeve 28, the piston with its compressed rings will likewise be lifted with the sleeve. The sleeve 28 will remain in loose telescoping relation over the stand 26. Plate 27 is next removed so that the rod is again pivotable relative to the piston, and the sleeve 29, with the attached piston is inverted, so that the rod 21 hangs downwardly.

Figure 7:
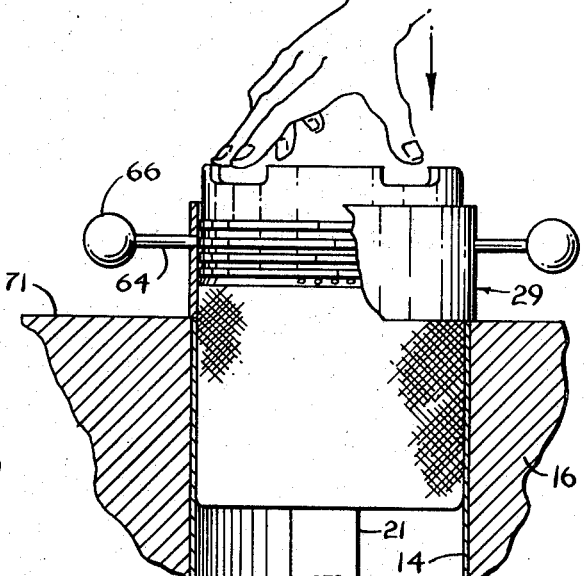
FIG. 7 shows the removed parts of FIG. 6 inverted and the piston being inserted in a cylinder bore.

In this latter position, the rod and piston as shown in FIG. 7 is lowered into the bore 14 until the lower end 47 of the sleeve rests on the top 71 of the cylinder surrounding the bore. Manual pressure on the cylinder end 36 will then force the ring portion of the piston into the cylinder, it being understood that the sleeve bore and cylinder bore are aligned so that the rings will remain in their compressed state during transfer.

The sleeve 29 is then reassembled with sleeve 28 and a new operation on another piston may commence. It will be appreciated that the above method requires a minimum of direct handling of the oily piston, and the system materially cuts down on the labor normally encountered in this operation.

In FIGS. 8 through 12 of the drawings, modified form of the invention is illustrated. This embodiment utilizes the same general inventive concept of the apparatus previously described, but possesses certain advantages and features not present in the main embodiment.

As well known in the art, the stiffest ring in a piston 12 is the oil ring with a steel expander behind it. This ring is designated at 13a in the drawings. With the presently to be described fixture, the arrangement is such that if this ring and its expander are not properly seated in its groove in the piston, the operator installing the fixture can immediately recognize this fact and consequently readily correct the situation.

As shown in FIG. 8, the piston 12 is placed on any suitable supporting surface, such as the previously described stand 26, and the piston rod 21 held in a vertical position by the support plate 27 (not shown in these figures for reasons of clarity). Then, a guide member 71 in the general form of an annular band is placed over the piston and moved downwardly towards the piston ring 13a. As shown, guide member 71 is provided with a first cylindrical bore portion 72 having an outwardly directed annular flange 73 at the upper end thereof. A secured enlarged bore portion 74 depends from portion 72 with a shoulder 76 defined therebetween. The outer surface 77 of bore portion 74 has a downwardly and inwardly tapered configuration of about 6 degrees.

In installing member 71, the operator centers the ring 13a and slightly compresses the same and moves the member downwardly until the shoulder 76 engages the upper edge of the ring, the latter being centered and restrained in the bore portion 74. As a safety factor, if ring 13a is not properly seated in the piston, the guide member will not be tight when installed and permit a degree of play. The operator should then reinstall the member on the ring. When properly installed, the guide member keeps the ring 13a centered for the next operation.

Next, a first fixture sleeve 81, generally corresponding to sleeve 29, and a second fixture sleeve 82, generally corresponding to sleeve 28 of the first embodiment of the invention are provided.

Sleeve 81 is supported on its lower edge 83 on a suitable supporting surface, and the sleeve will be seen to include an internal cylindrical bore portion 84 with diametrically extending handles 86 extending from the outer cylindrical surface 87 of the sleeve. Adjacent the upper edge of the sleeve there is provided a shoulder 88 with the wall portion 89 above the shoulder having an upwardly and inwardly directed taper of about 1 degree. Also, the side wall of the sleeve, adjacent the lower edge 83, is provided with a series of air vents 91 to facilitate insertion and removal of the piston therein as will be presently explained.

Sleeve 82 is of generally cylindrical configuration with an outer surface 92 having an inwardly directed notch 93 adapted to be engaged by the fingers of the operator in handling the sleeve. The lower edge 94 of sleeve 82 is lowered onto the upper edge of sleeve 81 in telescopical engagement therewith until such edge engages the shoulder 88. In general, the inner bore portion 96 of sleeve 82 tapers upwardly and outwardly with a bore portion 97 adjacent its upper edge being cylindrical. The bore taper varies along the length of the bore from about 1 degree to about 6 degrees. The lower bore portion has a shoulder 98 which engages the upper edge of sleeve 81 which the sleeves are telescopically engaged.

As the next step, the piston 12 with the guide member 71 therein is lowered onto the upper end of sleeve 82 until the flange 83 engages the upper edge 101 of the sleeve. The operator then pushes the piston downwardly so that the oil ring 13a, previously centered and confined in the guide member moves into engagement with the tapered bore portion 96 of sleeve 82. Continued downward movement then results in the rings being disposed another sleeve 81 with the bore portion 84 thereof compressing and retaining the rings.

At this time, the guide member 71 and sleeve 82 may be lifted and removed as shown in FIG. 11, leaving the piston restrained within sleeve 81. The latter is then inverted, the operator by engaging the handles can carry the piston to the appropriate engine cylinder and push down on the piston, causing the latter to enter the cylinder.

I claim:

1. Apparatus for compressing piston rings on a piston and for installing the piston in a cylinder comprising a pair of sleeve members, the first of said sleeve members having an inner bore with an enlarged portion adjacent one end thereof and tapering radially inwardly from said end whereby said first sleeve member may pass over said piston when the rings are in their expanded condition and cause said rings to be compressed as said member is moved axially relative to said piston, the other end of said first sleeve member having a radially enlarged cylindrical bore to telescopically receive a portion of the second of said sleeve members, said second sleeve member having a cylindrical bore portion forming a smooth continuation of the taper of said first member bore, means releasably retaining said sleeve members against axial displacement relative to each other, said means including a bayonet slot provided on diametrically opposed portions of said first sleeve member and extending from said other end thereof, said second sleeve member having diametrically opposed rod elements extending outwardly therefrom and being engageable in said slots, a transverse shoulder at the innermost portion of said radially enlarged cylindrical bore portion defining a seat for the inserted end of said second sleeve member, handle means carried on the distal ends of said rod elements and extending outwardly from diametrically opposed portions of said second sleeve member, said second member bore portion receiving and maintaining said piston rings in a compressed condition, and a diametrically slotted disk element adapted to seat in one end of a piston with the slot therein engaging a piston rod of the piston to maintain the rod in an axial position whereby said sleeve members may be freely inserted over said rod and onto said piston.

References Cited

UNITED STATES PATENTS

| 1,303,614 | 5/1919 | Swart | 29—222 |
| 1,325,177 | 12/1919 | Strohecker | 29—222 |
| 1,366,857 | 1/1921 | Zetzman | 29—222 |
| 1,892,989 | 1/1933 | Koza | 29—222 |
| 2,388,871 | 11/1945 | Scarff | 29—269 |
| 2,697,870 | 12/1954 | Zucker | 29—222 |

FOREIGN PATENTS

| 672,179 | 5/1952 | Great Britain | 29—222 |

WAYNE A. MORSE, JR., Primary Examiner

U.S. Cl. X.R.

29—269, 283